US011926986B2

(12) United States Patent
Kondo et al.

(10) Patent No.: US 11,926,986 B2
(45) Date of Patent: Mar. 12, 2024

(54) HYDRAULIC EXCAVATOR DRIVE SYSTEM

(71) Applicant: KAWASAKI JUKOGYO KABUSHIKI KAISHA, Kobe (JP)

(72) Inventors: Akihiro Kondo, Kobe (JP); Hideyasu Muraoka, Kobe (JP); Yoshiyuki Tode, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/022,664

(22) PCT Filed: Jul. 29, 2021

(86) PCT No.: PCT/JP2021/028115
§ 371 (c)(1),
(2) Date: Feb. 22, 2023

(87) PCT Pub. No.: WO2022/054449
PCT Pub. Date: Mar. 17, 2022

(65) Prior Publication Data

US 2023/0313487 A1 Oct. 5, 2023

(30) Foreign Application Priority Data

Sep. 9, 2020 (JP) ................................ 2020-151599

(51) Int. Cl.
*E02F 9/22* (2006.01)
*E02F 3/42* (2006.01)
(Continued)

(52) U.S. Cl.
CPC ............ *E02F 3/425* (2013.01); *E02F 9/2217* (2013.01); *E02F 9/2292* (2013.01); *F15B 11/17* (2013.01);
(Continued)

(58) Field of Classification Search
CPC ........ F15B 11/165; F15B 11/17; F15B 21/14; F15B 2211/6313; E02F 9/2217; E02F 9/2239; E02F 9/2242
See application file for complete search history.

(56) References Cited

U.S. PATENT DOCUMENTS 7,565,801 B2 * 7/2009 Tozawa ................ E02F 9/2075 60/486
7,634,911 B2 * 12/2009 Brinkman ............ E02F 9/2217 91/533

(Continued)

FOREIGN PATENT DOCUMENTS

JP 2005-315312 A 11/2005

*Primary Examiner* — Michael Leslie
(74) *Attorney, Agent, or Firm* — Oliff PLC

(57) ABSTRACT

A hydraulic excavator drive system includes: a first pump connected to a head-side chamber of a boom cylinder; and a second pump that supplies hydraulic oil to at least one of an arm cylinder or a bucket cylinder. The first pump is driven by an electric motor. The drive system further includes: a first switching valve located on a rod-side line; and a second switching valve located on a relay line. The first switching valve opens the rod-side line at a boom raising operation, but blocks the rod-side line except at the boom raising operation. The second switching valve blocks the relay line at the boom raising operation, but opens the relay line at a vehicle body lifting operation.

11 Claims, 4 Drawing Sheets

(51) Int. Cl.
*F15B 11/17* (2006.01)
*F15B 21/14* (2006.01)

(52) U.S. Cl.
CPC ....... *F15B 21/14* (2013.01); *F15B 2211/6313* (2013.01)

(56) References Cited

U.S. PATENT DOCUMENTS

| | | | | |
|---|---|---|---|---|
| 9,290,912 | B2 * | 3/2016 | Wen | F15B 13/06 |
| 10,604,915 | B2 * | 3/2020 | Joo | E02F 9/2246 |
| 10,988,915 | B2 * | 4/2021 | Kang | F15B 1/02 |
| 11,466,434 | B2 * | 10/2022 | Abell | F15B 11/0426 |
| 11,542,683 | B2 * | 1/2023 | Kang | E02F 9/2217 |
| 2023/0183946 | A1 * | 6/2023 | Kondo | E02F 9/2095 60/325 |
| 2023/0228063 | A1 * | 7/2023 | Kondo | E02F 9/2228 60/421 |

* cited by examiner

HYDRAULIC EXCAVATOR DRIVE SYSTEM

CROSS-REFERENCE TO RELATED APPLICATIONS

This application is a National Phase Application of PCT/JP2021/028115 filed on Jul. 29, 2021, and claims priority to Japanese Application No. 2020-151599 filed on Sep. 9, 2020, the entire disclosures of which are hereby incorporated herein.

TECHNICAL FIELD

The present disclosure relates to a hydraulic excavator drive system.

BACKGROUND ART

Generally speaking, in a hydraulic excavator, an arm is swingably coupled to the distal end of a boom that is luffed relative to a slewing structure, and a bucket is swingably coupled to the distal end of the arm. A drive system mounted in such a hydraulic excavator includes, for example, a boom cylinder that luffs the boom, an arm cylinder that swings the arm, and a bucket cylinder that swings the bucket. These hydraulic actuators are supplied with hydraulic oil from a pump.

For example, Patent Literature 1 discloses a boom cylinder driver for a hydraulic excavator. In the boom cylinder driver, the head-side chamber of the boom cylinder is directly connected to a pump that is driven by an electric motor. Accordingly, at a boom lowering operation, the electric motor functions as a power generator, and the potential energy of the boom is regenerated.

On the other hand, the rod-side chamber of the boom cylinder is connected to a tank and a hydraulic pressure source via a switching valve. The switching valve is switched between a normal position and an offset position. When the switching valve is in the normal position, the switching valve brings the rod-side chamber of the boom cylinder into communication with the tank. When the switching valve is in the offset position, the switching valve brings the rod-side chamber into communication with the hydraulic pressure source. The switching valve is controlled in accordance with the pressure of the head-side chamber of the boom cylinder.

More specifically, when the pressure of the head-side chamber is higher than a predetermined value, the switching valve is in the normal position. Accordingly, hydraulic oil flows from the rod-side chamber of the boom cylinder to the tank, or flows from the tank to the rod-side chamber. On the other hand, when the pressure of the head-side chamber is lower than the predetermined value, the switching valve is switched to the offset position. Accordingly, the hydraulic oil is supplied from the hydraulic pressure source to the rod-side chamber of the boom cylinder. In this manner, the pressure of the rod-side chamber of the boom cylinder can be increased.

Typical examples of when the pressure of the head-side chamber is higher than the predetermined value is when a boom raising operation is performed and when a boom lowering operation is performed. On the other hand, a typical example of when the pressure of the head-side chamber is lower than the predetermined value is when a vehicle body lifting operation is performed. The vehicle body lifting operation is an operation that is performed, even after the bucket is grounded such that the boom cannot be lowered any more by external force, intending to retract the boom cylinder (this operation is referred to as "body jack-up" in Patent Literature 1).

CITATION LIST

Patent Literature

PTL 1: Japanese Laid-Open Patent Application Publication No. 2005-315312

SUMMARY OF INVENTION

Technical Problem

However, the boom cylinder driver of Patent Literature 1 requires a pressure source dedicated for an operation during which the pressure of the head-side chamber is relatively low, such as the vehicle body lifting operation.

In view of the above, an object of the present disclosure is to provide a hydraulic excavator drive system capable of increasing the pressure of the rod-side chamber of the boom cylinder at the vehicle body lifting operation without using a pressure source dedicated for the vehicle body lifting operation.

Solution to Problem

In order to solve the above-described problems, a hydraulic excavator drive system according to the present disclosure includes: a boom cylinder; a first pump connected to a head-side chamber of the boom cylinder by a head-side line and driven by an electric motor; a second pump that supplies hydraulic oil to at least one of an arm cylinder or a bucket cylinder; a first switching valve located on a rod-side line that connects a rod-side chamber of the boom cylinder to the tank, the first switching valve being a switching valve that opens the rod-side line at a boom raising operation, but blocks the rod-side line at a vehicle body lifting operation; and a second switching valve located on a relay line that connects a part of the rod-side line, the part extending between the rod-side chamber and the first switching valve, to a supply line extending from the second pump, the second switching valve being a switching valve that blocks the relay line at the boom raising operation, but opens the relay line at the vehicle body lifting operation.

According to the above configuration, at the vehicle body lifting operation, the hydraulic oil delivered from the second pump, which is a pump for the arm cylinder and/or the bucket cylinder, is supplied to the rod-side chamber of the boom cylinder. This makes it possible to increase the pressure of the rod-side chamber of the boom cylinder at the vehicle body lifting operation without using a pressure source dedicated for the vehicle body lifting operation.

Advantageous Effects of Invention

The present disclosure makes it possible to increase the pressure of the rod-side chamber of the boom cylinder at the vehicle body lifting operation without using a pressure source dedicated for the vehicle body lifting operation.

DESCRIPTION OF EMBODIMENTS

Embodiment 1

Figure 1:
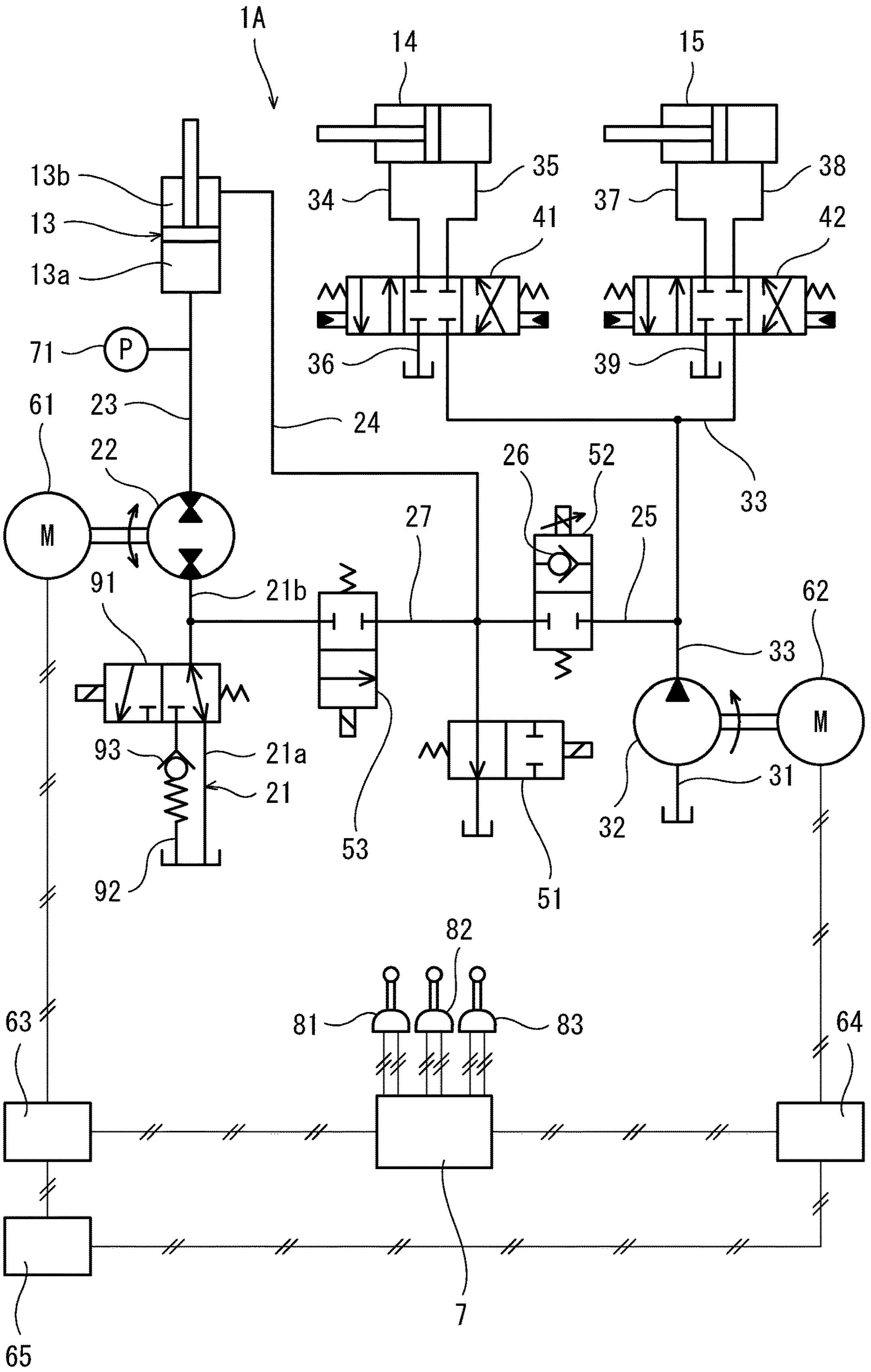
FIG. 1 shows a schematic configuration of a hydraulic excavator drive system according to Embodiment 1 of the present disclosure.
Figure 2:
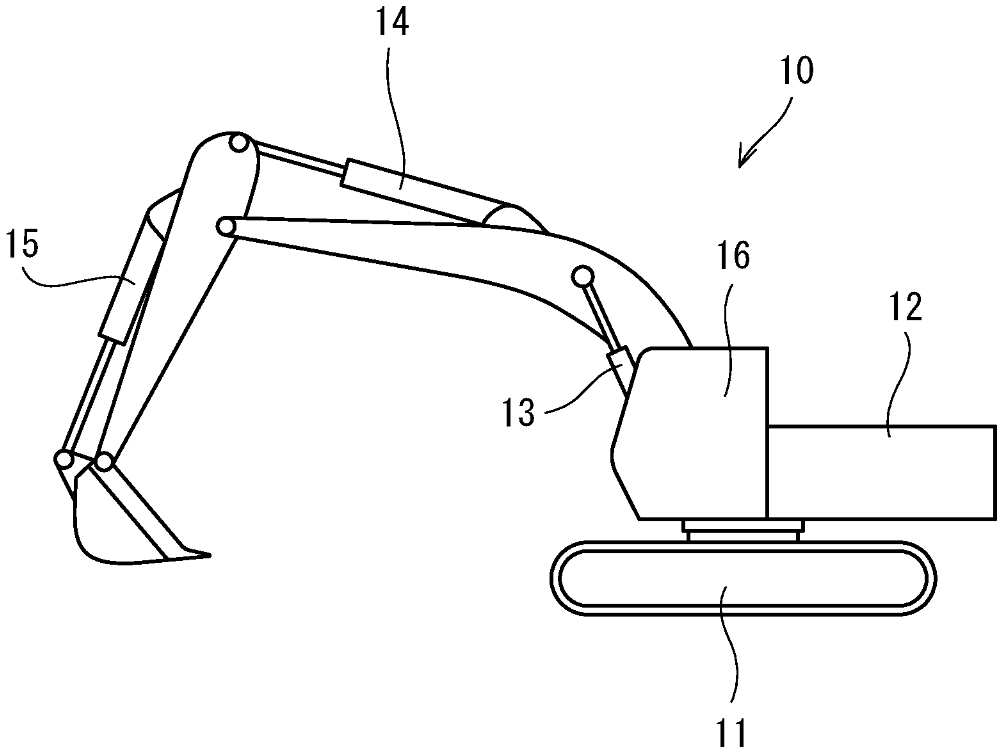
FIG. 2 is a side view of the hydraulic excavator.

FIG. 1 shows a hydraulic excavator drive system 1A according to Embodiment 1 of the present disclosure, and FIG. 2 shows a hydraulic excavator 10, in which the drive system 1A is mounted.

The hydraulic excavator 10 shown in FIG. 2 is a self-propelled hydraulic excavator, and includes a traveling structure 11. The hydraulic excavator 10 further includes a slewing structure 12 and a boom. The slewing structure 12 is slewably supported by the traveling structure 11. The boom is luffed relative to the slewing structure 12. An arm is swingably coupled to the distal end of the boom, and a bucket is swingably coupled to the distal end of the arm. The slewing structure 12 includes a cabin 16. The cabin 16 includes a driver's seat. The hydraulic excavator 10 need not be of a self-propelled type.

As shown in FIG. 1, the drive system 1A includes a boom cylinder 13, an arm cylinder 14, and a bucket cylinder 15 as hydraulic actuators. As shown in FIG. 2, the boom cylinder 13 luffs the boom. The arm cylinder 14 swings the arm. The bucket cylinder 15 swings the bucket. An unshown slewing motor and an unshown pair of left and right travel motors may be included either in the drive system 1A or in a different drive system.

The drive system 1A further includes a first pump 22 for the boom cylinder 13 and a second pump 32 for the arm cylinder 14 and the bucket cylinder 15. The first pump 22 supplies hydraulic oil to the boom cylinder 13 at a boom raising operation. The second pump 32 supplies the hydraulic oil to the arm cylinder 14 at an arm operation (an arm crowding operation or an arm pushing operation), and supplies the hydraulic oil to the bucket cylinder 15 at a bucket operation (a bucket excavating operation or a bucket dumping operation).

However, it is not essential for the second pump 32 to supply the hydraulic oil to both the arm cylinder 14 and the bucket cylinder 15. Instead, the second pump 32 may supply the hydraulic oil to either the arm cylinder 14 or the bucket cylinder 15. For example, in a case where the second pump 32 supplies the hydraulic oil only to the arm cylinder 14, the bucket cylinder 15 may be supplied with the hydraulic oil from a third pump.

To be more specific, the second pump 32 supplies the hydraulic oil to the arm cylinder 14 via an arm control valve 41, and supplies the hydraulic oil to the bucket cylinder 15 via a bucket control valve 42. The second pump 32 is connected to the tank by a suction line 31, and to the arm control valve 41 and the bucket control valve 42 by a supply line 33. In other words, the supply line 33 extends from the second pump 32, and branches into multiple lines that connect to the arm control valve 41 and the bucket control valve 42, respectively.

The arm control valve 41 controls the supply and discharge of the hydraulic oil to and from the arm cylinder 14. The arm control valve 41 is connected to the arm cylinder 14 by a pair of supply/discharge lines 34 and 35, and connected to the tank by a tank line 36.

Similarly, the bucket control valve 42 controls the supply and discharge of the hydraulic oil to and from the bucket cylinder 15. The bucket control valve 42 is connected to the bucket cylinder 15 by a pair of supply/discharge lines 37 and 38, and to the tank by a tank line 39.

In the present embodiment, each of the arm control valve 41 and the bucket control valve 42 moves in accordance with a pilot pressure. A pair of pilot ports of the arm control valve 41 is connected to an unshown pair of solenoid proportional valves, respectively. A pair of pilot ports of the bucket control valve 42 is connected to an unshown pair of solenoid proportional valves, respectively. Each of the arm control valve 41 and the bucket control valve 42 is controlled by control circuitry 7 via the corresponding pair of solenoid proportional valves. The control circuitry 7 will be described below.

Alternatively, each of the arm control valve 41 and the bucket control valve 42 may move in accordance with an electrical signal. In this case, each of the arm control valve 41 and the bucket control valve 42 is directly controlled by the control circuitry 7.

The first pump 22 for the boom cylinder 13 is connected to the tank by a suction/delivery line 21, and is directly connected to a head-side chamber 13*a* of the boom cylinder 13 by a head-side line 23. A rod-side chamber 13*b* of the boom cylinder 13 is connected to the tank by a rod-side line 24. A first switching valve 51 is located on the rod-side line 24.

The first switching valve 51 is switched between an open position (a left-side position in FIG. 1; in the present embodiment, a neutral position) and a closed position (a right-side position in FIG. 1). When the first switching valve 51 is in the open position, the first switching valve 51 opens the rod-side line 24, whereas when the first switching valve 51 is in the closed position, the first switching valve 51 blocks the rod-side line 24. In the present embodiment, at a boom raising operation, the first switching valve 51 is in the open position, whereas at a boom lowering operation and at a vehicle body lifting operation, the first switching valve 51 is in the closed position. In the description herein, an operation of lowering the boom when the bucket is in the air is referred to as "boom lowering operation" and an operation of lifting the body (i.e., the traveling structure 11 and the slewing structure 12) of the hydraulic excavator by pushing the bucket against, for example, the ground is referred to as "vehicle body lifting operation".

A part of the rod-side line 24, the part extending between the rod-side chamber 13*b* and the first switching valve 51, is connected to the aforementioned supply line 33 by a relay line 25. A second switching valve 52 is located on the relay line 25.

The second switching valve 52 is switched between a closed position (a lower position in FIG. 1; in the present embodiment, a neutral position) and an open position (an upper position in FIG. 1). When the second switching valve 52 is in the closed position, the second switching valve 52 blocks the relay line 25, whereas when the second switching valve 52 is in the open position, the second switching valve 52 opens the relay line 25. When the second switching valve 52 is in the open position, the opening area of the second switching valve 52 is changeable.

In the present embodiment, at a boom raising operation and at a boom lowering operation, the second switching valve 52 is in the closed position, whereas at a vehicle body lifting operation, the second switching valve 52 is in the open position. Accordingly, the hydraulic oil flows to the relay line 25 only at a vehicle body lifting operation.

In the present embodiment, a check valve 26 is included (incorporated) in the second switching valve 52. At a vehicle body lifting operation, the check valve 26 allows a flow from the supply line 33 toward the rod-side line 24, but prevents the reverse flow. Alternatively, the check valve 26 may be located on the relay line 25 at a position upstream or downstream of the second switching valve 52.

In the present embodiment, the suction/delivery line 21 is connected, by a regenerative line 27, to the part of the rod-side line 24, the part extending between the rod-side chamber 13*b* and the first switching valve 51. A third switching valve 53 is located on the regenerative line 27. A fourth switching valve 91 is located on the suction/delivery line 21, such that the suction/delivery line 21 is divided into a tank-side passage 21*a* and a pump-side passage 21*b*. That is, the regenerative line 27 connects the pump-side passage 21*b* of the suction/delivery line 21 to the part of the rod-side line 24, the part extending between the rod-side chamber 13*b* and the first switching valve 51.

The third switching valve 53 is switched between a closed position (an upper position in FIG. 1; in the present embodiment, a neutral position) and an open position (a lower position in FIG. 1). When the third switching valve 53 is in the closed position, the third switching valve 53 blocks the regenerative line 27, whereas when the third switching valve 53 is in the open position, the third switching valve 53 opens the regenerative line 27. At a boom lowering operation, the third switching valve 53 is in the open position. Except at a boom lowering operation, the third switching valve 53 is in the closed position.

The fourth switching valve 91 is connected to the tank by a parallel line 92. A check valve 93 having a predetermined cracking pressure (e.g., 0.1 to 3.0 MPa) is located on the parallel line 92. The fourth switching valve 91 is switched between a normal position (a right-side position in FIG. 1; in the present embodiment, a neutral position) and a regenerative position (a left-side position in FIG. 1). When the fourth switching valve 91 is in the normal position, the fourth switching valve 91 blocks the parallel line 92 and brings the pump-side passage 21*b* of the suction/delivery line 21 into communication with the tank-side passage 21*a*, whereas when the fourth switching valve 91 is in the regenerative position, the fourth switching valve 91 blocks the tank-side passage 21*a* and brings the pump-side passage 21*b* into communication with the parallel line 92. At a boom lowering operation, the fourth switching valve 91 is in the regenerative position. Except at a boom lowering operation, the fourth switching valve 91 is in the normal position.

In the present embodiment, each of the first switching valve 51, the second switching valve 52, the third switching valve 53, and the fourth switching valve 91 moves in accordance with an electrical signal. The first switching valve 51, the second switching valve 52, the third switching valve 53, and the fourth switching valve 91 are controlled by the control circuitry 7. Alternatively, at least one of the first switching valve 51, the second switching valve 52, the third switching valve 53, or the fourth switching valve 91 may move in accordance with a pilot pressure. For example, in a case where the first switching valve 51 moves in accordance with a pilot pressure, the first switching valve 51 is controlled by the control circuitry 7 via a solenoid proportional valve.

The first pump 22 is driven by a first electric motor 61, and the second pump 32 is driven by a second electric motor 62. The first electric motor 61 and the second electric motor 62 are connected to a battery 65 via an inverter 63 and an inverter 64, respectively. Specifically, when the first electric motor 61 drives the first pump 22, the battery 65 supplies electric power to the first electric motor 61, and when the second electric motor 62 drives the second pump 32, the battery 65 supplies electric power to the second electric motor 62. A capacitor may be used instead of the battery 65. The first electric motor 61 and the second electric motor 62 are controlled by the control circuitry 7 via the inverter 63 and the inverter 64, respectively.

The cabin 16 includes therein a boom operator 81, an arm operator 82, and a bucket operator 83. The boom operator 81 includes an operating lever that is operated in a boom raising direction and a boom lowering direction. The arm operator 82 includes an operating lever that is operated in an arm crowding direction and an arm pushing direction. The bucket operator 83 includes an operating lever that is operated in a bucket excavating direction and a bucket dumping direction. Each of the boom operator 81, the arm operator 82, and the bucket operator 83 outputs an operation signal corresponding to an operating direction and an operating amount (an inclination angle) of the operating lever.

Specifically, when the operating lever of the boom operator 81 is operated in the boom raising direction, the boom operator 81 outputs a boom raising operation signal corresponding to the operating amount of the operating lever, and when the operating lever of the boom operator 81 is operated in the boom lowering direction, the boom operator 81 outputs a boom lowering operation signal corresponding to the operating amount of the operating lever. Similarly, when the operating lever of the arm operator 82 is operated in the arm crowding direction or the arm pushing direction, the arm operator 82 outputs an arm operation signal (an arm crowding operation signal or an arm pushing operation signal) corresponding to the operating amount of the operating lever, and when the operating lever of the bucket operator 83 is operated in the bucket excavating direction or the bucket dumping direction, the bucket operator 83 outputs a bucket operation signal (a bucket excavating operation signal or a bucket dumping operation signal) corresponding to the operating amount of the operating lever.

In the present embodiment, each of the boom operator 81, the arm operator 82, and the bucket operator 83 is an electrical joystick that outputs an electrical signal as an operation signal. Alternatively, each of the arm operator 82 and the bucket operator 83 may be a pilot operation valve that outputs a pilot pressure as an operation signal. In this case, the pair of pilot ports of the arm control valve 41 may be connected to the arm operator 82, and the pair of pilot ports of the bucket control valve 42 may be connected to the bucket operator 83.

Operation signals (electrical signals) outputted from the boom operator 81, the arm operator 82, and the bucket operator 83 are inputted to the control circuitry 7. For example, the control circuitry 7 is realized by a computer that includes memories such as a ROM and RAM, a storage such as a HDD or SSD, and a CPU. The CPU executes a program stored in the ROM or the storage.

When an arm operation signal is outputted from the arm operator 82 (i.e., at an arm operation), the control circuitry 7 controls the arm control valve 41 via an unshown solenoid proportional valve, such that the greater the operating amount of the operating lever of the arm operator 82, the greater the opening area of the arm control valve 41. In a case where the operating lever of only the arm operator 82 is operated, the control circuitry 7 may adjust the rotation speed of the second electric motor 62 via the inverter 64, such that the greater the operating amount of the operating lever of the arm operator 82, the higher the delivery flow rate of the second pump 32. Alternatively, the rotation speed of the second electric motor 62 may be constant.

Similarly, when a bucket operation signal is outputted from the bucket operator 83 (i.e., at a bucket operation), the control circuitry 7 controls the bucket control valve 42 via an unshown solenoid proportional valve, such that the greater the operating amount of the operating lever of the bucket operator 83, the greater the opening area of the bucket control valve 42. In a case where the operating lever of only the bucket operator 83 is operated, the control circuitry 7 may adjust the rotation speed of the second electric motor 62 via the inverter 64, such that the greater the operating amount of the operating lever of the bucket operator 83, the higher the delivery flow rate of the second pump 32. Alternatively, the rotation speed of the second electric motor 62 may be constant.

When a boom raising operation signal is outputted from the boom operator 81 (i.e., at a boom raising operation), the control circuitry 7 adjusts the rotation speed of the first electric motor 61 via the inverter 63, such that the greater the operating amount of the operating lever of the boom operator 81, the higher the delivery flow rate of the first pump 22.

Also, at the boom raising operation, the control circuitry 7 keeps the first switching valve 51 in the open position, keeps the second switching valve 52 in the closed position, keeps the third switching valve 53 in the closed position, and keeps the fourth switching valve 91 in the normal position. That is, the control circuitry 7 feeds no command current to the first switching valve 51, the second switching valve 52, the third switching valve 53, and the fourth switching valve 91. Accordingly, the hydraulic oil is sucked from the tank to the first pump 22 through the suction/delivery line 21 (the tank-side passage 21*a*, the fourth switching valve 91, and the pump-side passage 21*b*), and the hydraulic oil discharged from the rod-side chamber 13*b* of the boom cylinder 13 flows into the tank through the rod-side line 24.

When a boom lowering operation signal is outputted from the boom operator 81, the control circuitry 7 determines which one of a boom lowering operation or a vehicle body lifting operation has been performed. In the present embodiment, the control circuitry 7 is electrically connected to a pressure sensor 71, which detects the pressure Ph of the head-side chamber 13*a* of the boom cylinder 13. In the illustrated example, the pressure sensor 71 is located on the head-side line 23. Alternatively, the pressure sensor 71 may be located on the head-side chamber 13*a* of the boom cylinder 13.

In a case where a boom lowering operation signal is outputted from the boom operator 81 and the pressure Ph detected by the pressure sensor 71 is higher than a predetermined value (the predetermined value is set within the range of, for example, 0.5 to 10 MPa), the control circuitry 7 determines that a boom lowering operation has been performed. On the other hand, in a case where a boom lowering operation signal is outputted from the boom operator 81 and the pressure Ph detected by the pressure sensor 71 is lower than the predetermined value, the control circuitry 7 determines that a vehicle body lifting operation has been performed. That is, when the pressure Ph detected by the pressure sensor 71 falls below the predetermined value during the operating lever of the boom operator 81 being operated in the boom lowering direction, the control circuitry 7 determines that a vehicle body lifting operation has started.

A method of determining which one of a boom lowering operation or a vehicle body lifting operation has been performed when a boom lowering operation signal is outputted from the boom operator 81 is not limited to the above-described one. For example, in a case where a boom lowering operation signal is outputted from the boom operator 81 and a regenerative current generated by the first electric motor 61 is greater than a predetermined value, the control circuitry 7 may determine that a boom lowering operation has been performed, whereas in a case where a boom lowering operation signal is outputted from the boom operator 81 and the regenerative current generated by the first electric motor 61 is less than the predetermined value, the control circuitry 7 may determine that a vehicle body lifting operation has been performed. That is, when the regenerative current generated by the first electric motor 61 falls below the predetermined value during the operating lever of the boom operator 81 being operated in the boom lowering direction, the control circuitry 7 may determine that a vehicle body lifting operation has started.

Alternatively, in a case where a boom lowering operation signal is outputted from the boom operator 81 and the pressure Pr of the rod-side chamber 13*b* of the boom cylinder 13 is lower than a predetermined value, the control circuitry 7 may determine that a boom lowering operation has been performed, whereas in a case where a boom lowering operation signal is outputted from the boom operator 81 and the pressure Pr of the rod-side chamber 13*b* is greater than the predetermined value, the control circuitry 7 may determine that a vehicle body lifting operation has been performed.

At a boom lowering operation, the control circuitry 7 switches the first switching valve 51 to the closed position and switches the third switching valve 53 to the open position while keeping the second switching valve 52 in the closed position. Further, the control circuitry 7 switches the fourth switching valve 91 to the regenerative position. That is, the control circuitry 7 feeds a command current to each of the first switching valve 51, the third switching valve 53, and the fourth switching valve 91. Accordingly, part of the hydraulic oil that has been discharged from the head-side chamber 13*a* of the boom cylinder 13 and that has passed through the first pump 22 flows into the rod-side chamber 13*b* through the regenerative line 27 and the rod-side line 24, and the remaining part of the hydraulic oil flows into the tank through the fourth switching valve 91 and the parallel line 92.

At the boom lowering operation, the first pump 22 is driven as a motor by the hydraulic oil discharged from the head-side chamber 13*a* of the boom cylinder 13. Accordingly, the first electric motor 61 functions as a power generator, and the potential energy of the boom is regenerated. The generated electric power is stored in the battery 65. At the boom lowering operation, the control circuitry 7 reduces the regenerative torque (braking force) of the first electric motor 61 in accordance with increase in the operating amount of the operating lever of the boom operator 81.

When the control circuitry 7 determines as described above that a vehicle body lifting operation has started, the control circuitry 7 switches the second switching valve 52 from the closed position to the open position via an unshown solenoid proportional valve. To be more specific, at the vehicle body lifting operation, the control circuitry 7 switches the first switching valve 51 to the closed position and switches the second switching valve 52 to the open position while keeping the third switching valve 53 in the closed position and keeping the fourth switching valve 91 in the normal position. That is, the control circuitry 7 feeds a command current to each of the first switching valve 51 and the second switching valve 52. Accordingly, the hydraulic oil delivered from the second pump 32 is supplied to the rod-side chamber 13*b* of the boom cylinder 13 via the supply line 33, the relay line 25 (the second switching valve 52), and the rod-side line 24. The hydraulic oil that has been discharged from the head-side chamber 13*a* of the boom cylinder 13 and that has passed through the first pump 22 flows into the tank through the suction/delivery line 21 (the pump-side passage 21*b*, the fourth switching valve 91, and the tank-side passage 21*a*).

Also, at the vehicle body lifting operation, the control circuitry 7 adjusts the delivery flow rate of the second pump 32 in accordance with the operating amount of the operating lever of the boom operator 81. For example, at the vehicle body lifting operation, if neither the arm operator 82 nor the bucket operator 83 is operated, the control circuitry 7 adjusts the rotation speed of the second electric motor 62 via the inverter 64, such that the greater the operating amount of the operating lever of the boom operator 81, the higher the delivery flow rate of the second pump 32.

Also, at the vehicle body lifting operation, if neither the arm operator 82 nor the bucket operator 83 is operated, the control circuitry 7 controls the second switching valve 52 to maximize the opening area of the second switching valve 52, whereas if either one of the arm operator 82 or the bucket operator 83 is operated, the control circuitry 7 controls the second switching valve 52 such that the second switching valve 52 functions as a restrictor.

As described above, in the hydraulic excavator drive system 1 of the present embodiment, at a vehicle body lifting operation, the hydraulic oil delivered from the second pump 32, which is a pump for the arm cylinder 14 and the bucket cylinder 15, is supplied to the rod-side chamber 13*b* of the boom cylinder 13. This makes it possible to increase the pressure of the rod-side chamber 13*b* of the boom cylinder 13 at the vehicle body lifting operation without using a pressure source dedicated for the vehicle body lifting operation.

Moreover, in the present embodiment, since the delivery flow rate of the second pump 32 is adjusted at the vehicle body lifting operation, an occurrence of cavitation at the rod-side chamber 13*b* of the boom cylinder 13 can be prevented by the second pump 32.

Furthermore, since the present embodiment adopts the third switching valve 53, at a boom lowering operation, the hydraulic oil delivered from the first pump 22 can be regenerated without returning it to the tank. In addition, at the boom lowering operation, since the fourth switching valve 91 is switched to the regenerative position, the pressure of the hydraulic oil regenerated at the boom lowering operation is kept high. This consequently makes it possible to surely prevent the occurrence of cavitation at the rod-side chamber 13*b* of the boom cylinder 13.

In the present embodiment, since the check valve 26 is included the second switching valve 52, even when a vehicle body lifting operation is performed concurrently with an arm operation or a bucket operation, the boom cylinder 13 can be prevented from extending.

Further, in the present embodiment, at a vehicle body lifting operation, if neither the arm operator 82 nor the bucket operator 83 is operated, the opening area of the second switching valve 52 is maximized, which makes it possible suppress, at the second switching valve 52, pressure loss in the hydraulic oil supplied from the second pump 32 to the rod-side chamber 13*b*. On the other hand, if either one of the arm operator 82 or the bucket operator 83 is operated, the second switching valve 52 functions as a restrictor, and thereby a necessary delivery pressure of the second pump 32 can be secured.

Variations

In the above-described embodiment, at a boom lowering operation, the second switching valve 52 is in the closed position. Alternatively, at a boom lowering operation, the second switching valve 52 may be in the open position. At a boom lowering operation, if suction of the hydraulic oil into the rod-side chamber 13*b* is insufficient, it causes cavitation. Therefore, at a boom lowering operation, by switching the second switching valve 52 to the open position to supply the hydraulic oil (pressurized oil) delivered from the second pump 32 to the rod-side chamber 13*b*, the cavitation can be prevented.

In a case where the second switching valve 52 is in the open position at a boom lowering operation, regarding the opening area of the second switching valve 52, the same control as that performed at a vehicle body lifting operation is performed at the boom lowering operation. Specifically, at the boom lowering operation, if neither the arm operator 82 nor the bucket operator 83 is operated, the control circuitry 7 controls the second switching valve 52 to maximize the opening area of the second switching valve 52, whereas if either one of the arm operator 82 or the bucket operator 83 is operated, the control circuitry 7 controls the second switching valve 52 such that the second switching valve 52 functions as a restrictor.

Thus, similar to at a vehicle body lifting operation in the above-described embodiment, also at a boom lowering operation, if neither the arm operator 82 nor the bucket operator 83 is operated, pressure loss at the second switching valve 52 can be suppressed, whereas if either one of the arm operator 82 or the bucket operator 83 is operated, a necessary delivery pressure of the second pump 32 can be secured. In a case where the second switching valve 52 is in the open position at a boom lowering operation, the check valve 26 functions also at the boom lowering operation.

All of the above-described variations are applicable also to Embodiment 2.

Embodiment 2

Figure 3:
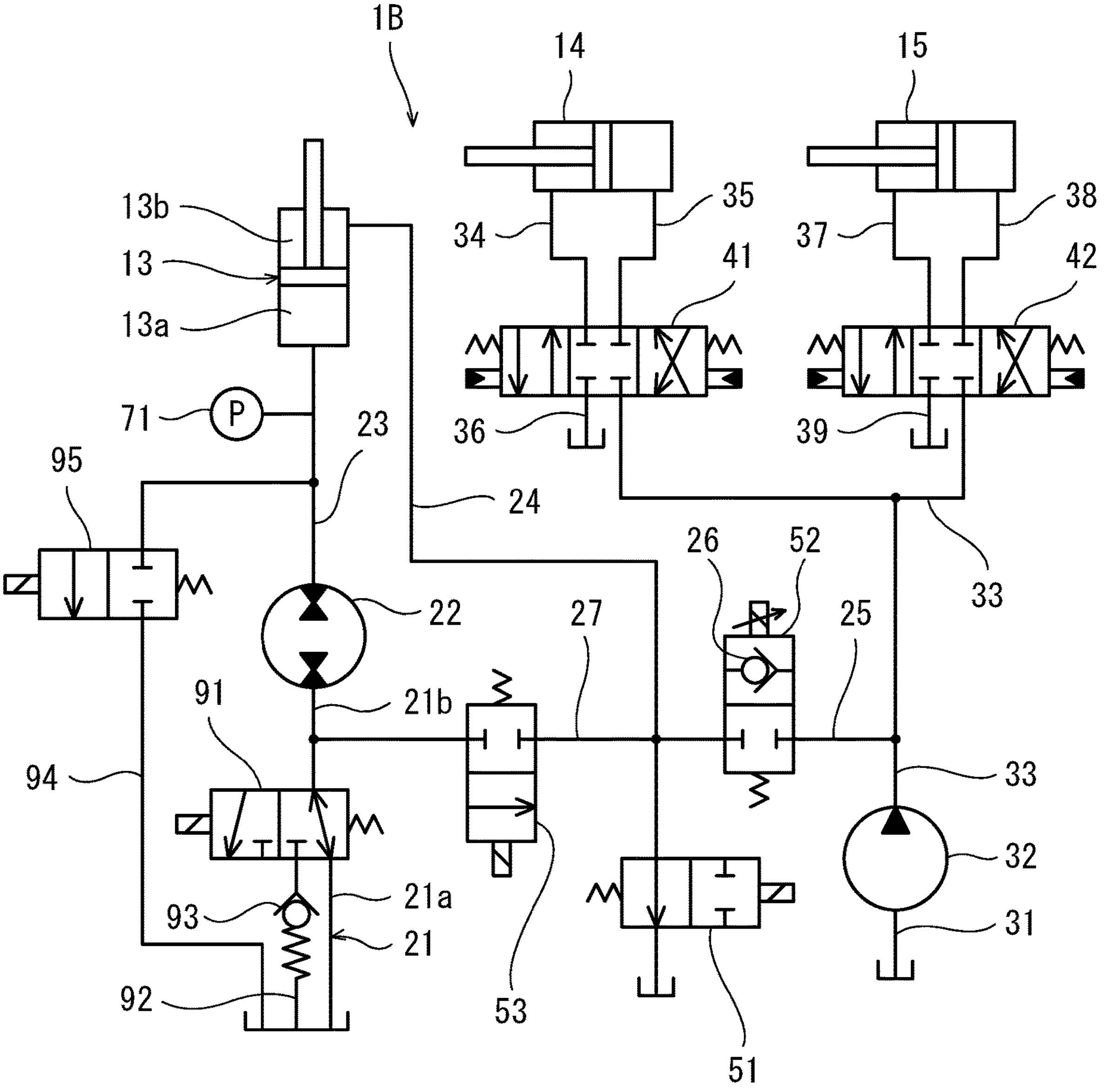
FIG. 3 shows a schematic configuration of a hydraulic excavator drive system according to Embodiment 2 of the present disclosure.

FIG. 3 shows a hydraulic excavator drive system 1B according to Embodiment 2 of the present disclosure. In the present embodiment, the same components as those described in Embodiment 1 are denoted by the same reference signs as those used in Embodiment 1, and repeating the same descriptions is avoided. In FIG. 3, the illustration some components, such as the first electric motor 61, the second electric motor 62, and the control circuitry 7, is omitted.

In the present embodiment, the head-side line 23 is connected to the tank by a bypass line 94. A vehicle body lifting switching valve 95 is located on the bypass line 94. The unshown control circuitry 7 controls the vehicle body lifting switching valve 95 such that, except at a vehicle body lifting operation, the vehicle body lifting switching valve 95 is in a closed position (a right-side position in FIG. 3; in the present embodiment, a neutral position) in which the vehicle body lifting switching valve 95 blocks the bypass line 94, whereas at a vehicle body lifting operation, the vehicle body lifting switching valve 95 is in an open position (a left-side position in FIG. 3) in which the vehicle body lifting switching valve 95 opens the bypass line 94.

The present embodiment provides the same advantageous effects as those provided by Embodiment 1. Further, in the present embodiment, at a vehicle body lifting operation, since the hydraulic oil discharged from the head-side chamber 13*a* of the boom cylinder 13 is returned to the tank without passing through the first pump 22, energy efficiency can be improved compared to a case where the hydraulic oil is returned to the tank in a manner to pass through the first pump 22 as in Embodiment 1.

Other Embodiments

The present disclosure is not limited to the above-described embodiments. Various modifications can be made without departing from the scope of the present disclosure.

For example, in Embodiment 1 and Embodiment 2, each of the first pump 22 and the second pump 32 need not be a fixed displacement pump, but may be a variable displacement pump. In a case where the second pump 32 is a variable displacement pump, the second pump 32 may be driven by an engine (an internal combustion engine).

In a case where the second pump 32 is a variable displacement pump, the control circuitry 7 may adjust the delivery flow rate of the second pump 32 in accordance with the operating amount of the operating lever of the boom operator 81 by changing the tilting angle of the second pump 32.

The regenerative line 27, on which the third switching valve 53 is located, and the fourth switching valve 91 may be eliminated. In this case, at a boom lowering operation, the first switching valve 51 is in the open position.

Figure 4:
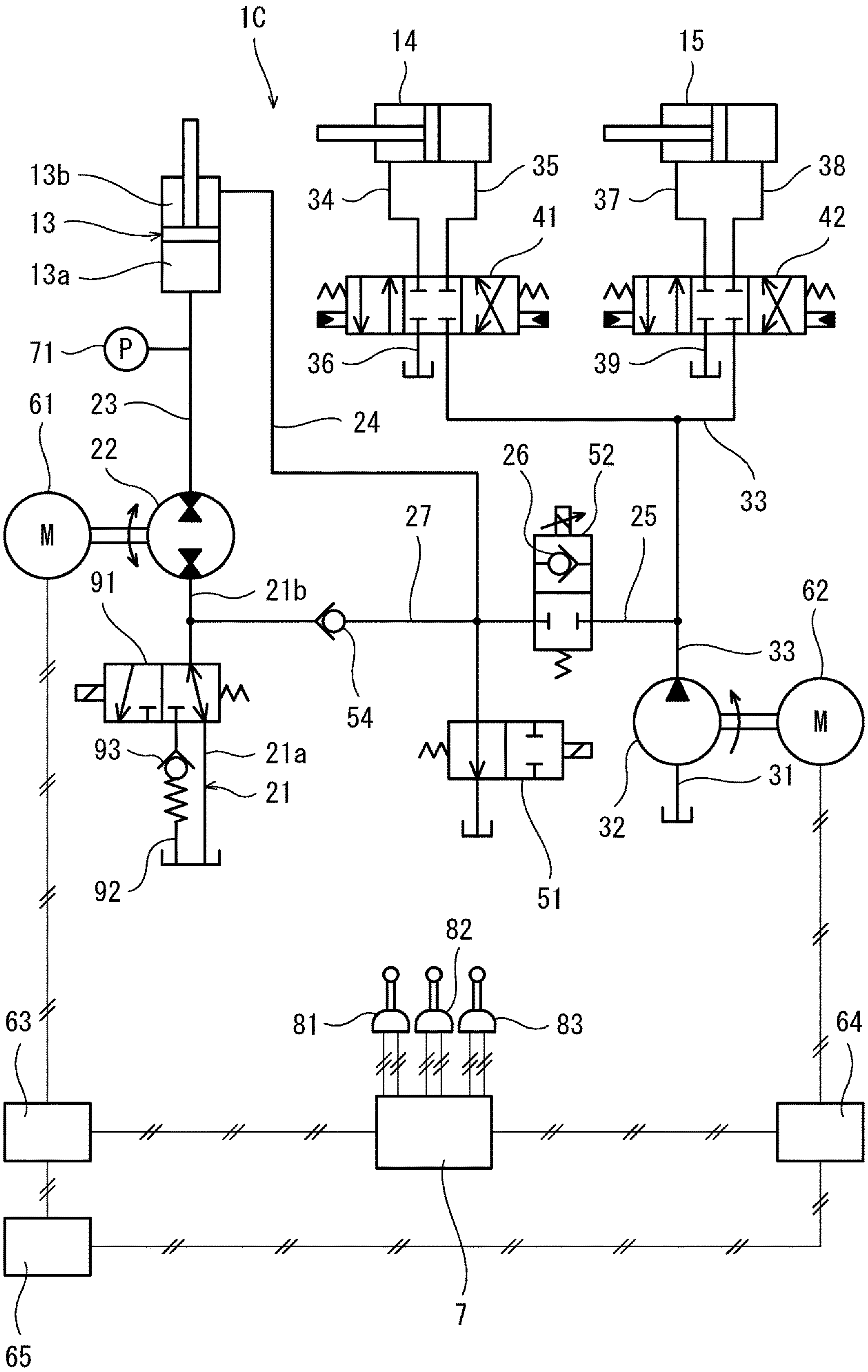
FIG. 4 shows a schematic configuration of a hydraulic excavator drive system according to a variation.

Alternatively, as in a hydraulic excavator drive system 1C according to a variation shown in FIG. 4, in Embodiment 1 and Embodiment 2, instead of the third switching valve 53, a check valve 54 may be located on the regenerative line 27. The check valve 54 allows a flow from the suction/delivery line 21 toward the rod-side line 24, but prevents the reverse flow. In the case of adopting this configuration, although pressure loss tends to increase, the circuit configuration is simplified, which makes it possible to reduce the cost.

Summary

A hydraulic excavator drive system according to the present disclosure includes: a boom cylinder; a first pump connected to a head-side chamber of the boom cylinder by a head-side line and driven by an electric motor; a second pump that supplies hydraulic oil to at least one of an arm cylinder or a bucket cylinder; a first switching valve located on a rod-side line that connects a rod-side chamber of the boom cylinder to the tank, the first switching valve being a switching valve that opens the rod-side line at a boom raising operation, but blocks the rod-side line at a vehicle body lifting operation; and a second switching valve located on a relay line that connects a part of the rod-side line, the part extending between the rod-side chamber and the first switching valve, to a supply line extending from the second pump, the second switching valve being a switching valve that blocks the relay line at the boom raising operation, but opens the relay line at the vehicle body lifting operation.

According to the above configuration, at the vehicle body lifting operation, the hydraulic oil delivered from the second pump, which is a pump for the arm cylinder and/or the bucket cylinder, is supplied to the rod-side chamber of the boom cylinder. This makes it possible to increase the pressure of the rod-side chamber of the boom cylinder at the vehicle body lifting operation without using a pressure source dedicated for the vehicle body lifting operation.

For example, at the boom raising operation and at a boom lowering operation, the second switching valve may be in a closed position in which the second switching valve blocks the relay line, and at the vehicle body lifting operation, the second switching valve may be in an open position in which the second switching valve opens the relay line. In this case, the above hydraulic excavator drive system may include: a boom operator including an operating lever that is operated in a boom raising direction and a boom lowering direction; and control circuitry that controls the electric motor and the second switching valve. When a regenerative current generated by the electric motor falls below a predetermined value during the operating lever of the boom operator being operated in the boom lowering direction, the control circuitry may determine that the vehicle body lifting operation has started, and switch the second switching valve from the closed position to the open position.

In a case where the second switching valve is in the closed position at the boom lowering operation, the above hydraulic excavator drive system may include: a boom operator including an operating lever that is operated in a boom raising direction and a boom lowering direction; a pressure sensor that detects a pressure of the head-side chamber of the boom cylinder; and control circuitry that controls the electric motor and the second switching valve. When the pressure detected by the pressure sensor falls below a predetermined value during the operating lever of the boom operator being operated in the boom lowering direction, the control circuitry may determine that the vehicle body lifting operation has started, and switch the second switching valve from the closed position to the open position.

Alternatively, at the boom raising operation, the second switching valve may be in a closed position in which the second switching valve blocks the relay line, and at a boom lowering operation and at the vehicle body lifting operation, the second switching valve may be in an open position in which the second switching valve opens the relay line. The first switching valve may block the rod-side line at the boom lowering operation.

The above hydraulic excavator drive system may include: a boom operator; an arm operator; a bucket operator; and control circuitry that controls the electric motor and the second switching valve. When the second switching valve is in an open position in which the second switching valve opens the relay line, an opening area of the second switching valve may be changeable. When the second switching valve is in the open position, if neither the arm operator nor the bucket operator is operated, the control circuitry may control the second switching valve to maximize the opening area of the second switching valve, and if either one of the arm operator or the bucket operator is operated, the control circuitry may control the second switching valve such that the second switching valve functions as a restrictor. According to this configuration, in a case where the second switching valve is in the open position, if neither the arm operator nor the bucket operator is operated, the opening area of the second switching valve is maximized, which makes it possible to suppress, at the second switching valve, pressure loss in the hydraulic oil supplied from the second pump to the rod-side chamber. On the other hand, if either one of the arm operator or the bucket operator is operated, the second switching valve functions as a restrictor, and thereby a necessary delivery pressure of the second pump can be secured.

The above hydraulic excavator drive system may include: a boom operator including an operating lever that is operated in a boom raising direction and a boom lowering direction; and control circuitry that controls the electric motor and adjusts a delivery flow rate of the second pump. The control circuitry, at the vehicle body lifting operation, may adjust the delivery flow rate of the second pump in accordance with an operating amount of the operating lever of the boom operator. According to this configuration, an occurrence of cavitation at the rod-side chamber of the boom cylinder can be prevented by the second pump.

A check valve that, at least, at the vehicle body lifting operation, allows a flow from the supply line toward the rod-side line but prevents a reverse flow may be located at the second switching valve or the relay line. According to this configuration, even when the vehicle body lifting operation is performed concurrently with an arm operation or a bucket operation, the boom cylinder can be prevented from extending.

The first pump may be connected to the tank by a suction/delivery line. The above hydraulic excavator drive system may include a third switching valve located on a regenerative line that connects the suction/delivery line to a part of the rod-side line, the part extending between the rod-side chamber and the first switching valve, the third switching valve being a switching valve that opens the regenerative line at a boom lowering operation, but blocks the regenerative line except at the boom lowering operation. The first switching valve may block the rod-side line at the boom lowering operation. According to this configuration, at the boom lowering operation, the hydraulic oil delivered from the first pump can be regenerated without returning it to the tank.

A fourth switching valve may be located on the suction/delivery line, such that the suction/delivery line is divided into a tank-side passage and a pump-side passage. The regenerative line may connect the pump-side passage of the suction/delivery line to the part of the rod-side line, the part extending between the rod-side chamber and the first switching valve. The fourth switching valve may be connected to the tank by a parallel line on which a check valve having a predetermined cracking pressure is located. At the boom lowering operation, the fourth switching valve may bring the pump-side passage into communication with the parallel line, but except at the boom lowering operation, the fourth switching valve may bring the pump-side passage into communication with the tank-side passage. According to this configuration, since the pressure of the hydraulic oil regenerated at the boom lowering operation is kept high, the occurrence of cavitation at the rod-side chamber can be surely prevented.

The above hydraulic excavator drive system may include a vehicle body lifting switching valve located on a bypass line that connects the head-side line to the tank, the vehicle body lifting switching valve being a switching valve that opens the bypass line at the vehicle body lifting operation, but blocks the bypass line except at the vehicle body lifting operation. According to this configuration, at the vehicle body lifting operation, since the hydraulic oil discharged from the head-side chamber of the boom cylinder is returned to the tank without passing through the first pump, energy efficiency can be improved compared to a case where the hydraulic oil is returned to the tank in a manner to pass through the first pump.

REFERENCE SIGNS LIST

1A, 1B hydraulic excavator drive system
10 hydraulic excavator
13 boom cylinder
13*a* head-side chamber
13*b* rod-side chamber
14 arm cylinder
15 bucket cylinder
21 suction/delivery line
21*a* tank-side passage
21*b* pump-side passage
22 first pump
23 head-side line
24 rod-side line
25 relay line
26 check valve
27 regenerative line
32 second pump
33 supply line
51 first switching valve
52 second switching valve
53 third switching valve
61 first electric motor
62 second electric motor
7 control circuitry
71 pressure sensor
81 boom operator
82 arm operator
83 bucket operator
91 fourth switching valve
92 parallel line
93 check valve
94 bypass line
95 vehicle body lifting switching valve

The invention claimed is:

1. A hydraulic excavator drive system comprising:
- a boom cylinder;
- a first pump connected to a head-side chamber of the boom cylinder by a head-side line and driven by an electric motor;
- a second pump that supplies hydraulic oil to at least one of an arm cylinder or a bucket cylinder;
- a first switching valve located on a rod-side line that connects a rod-side chamber of the boom cylinder to a tank, the first switching valve being a switching valve that opens the rod-side line at a boom raising operation, but blocks the rod-side line at a vehicle body lifting operation; and
- a second switching valve located on a relay line that connects a part of the rod-side line, the part extending between the rod-side chamber and the first switching valve, to a supply line extending from the second pump, the second switching valve being a switching valve that blocks the relay line at the boom raising operation, but opens the relay line at the vehicle body lifting operation.

2. The hydraulic excavator drive system according to claim 1, wherein
- at the boom raising operation and at a boom lowering operation, the second switching valve is in a closed position in which the second switching valve blocks the relay line, and
- at the vehicle body lifting operation, the second switching valve is in an open position in which the second switching valve opens the relay line.

3. The hydraulic excavator drive system according to claim 2, comprising:
- a boom operator including an operating lever that is operated in a boom raising direction and a boom lowering direction; and control circuitry that controls the electric motor and the second switching valve, wherein when a regenerative current generated by the electric motor falls below a predetermined value during the operating lever of the boom operator being operated in the boom lowering direction, the control circuitry determines that the vehicle body lifting operation has started, and switches the second switching valve from the closed position to the open position.

4. The hydraulic excavator drive system according to claim 2, comprising:

a boom operator including an operating lever that is operated in a boom raising direction and a boom lowering direction;

a pressure sensor that detects a pressure of the head-side chamber of the boom cylinder; and control circuitry that controls the electric motor and the second switching valve, wherein when the pressure detected by the pressure sensor falls below a predetermined value during the operating lever of the boom operator being operated in the boom lowering direction, the control circuitry determines that the vehicle body lifting operation has started, and switches the second switching valve from the closed position to the open position.

5. The hydraulic excavator drive system according to claim 1, wherein at the boom raising operation, the second switching valve is in a closed position in which the second switching valve blocks the relay line, and at a boom lowering operation and at the vehicle body lifting operation, the second switching valve is in an open position in which the second switching valve opens the relay line, and the first switching valve blocks the rod-side line at the boom lowering operation.

6. The hydraulic excavator drive system according to claim 1, comprising:

a boom operator;

an arm operator;

a bucket operator; and control circuitry that controls the electric motor and the second switching valve, wherein when the second switching valve is in an open position in which the second switching valve opens the relay line, an opening area of the second switching valve is changeable, and when the second switching valve is in the open position, if neither the arm operator nor the bucket operator is operated, the control circuitry controls the second switching valve to maximize the opening area of the second switching valve, and if either one of the arm operator or the bucket operator is operated, the control circuitry controls the second switching valve such that the second switching valve functions as a restrictor.

7. The hydraulic excavator drive system according to claim 1, comprising:

a boom operator including an operating lever that is operated in a boom raising direction and a boom lowering direction; and control circuitry that controls the electric motor and adjusts a delivery flow rate of the second pump, wherein the control circuitry, at the vehicle body lifting operation, adjusts the delivery flow rate of the second pump in accordance with an operating amount of the operating lever of the boom operator.

8. The hydraulic excavator drive system according to claim 1, wherein a check valve that, at least, at the vehicle body lifting operation, allows a flow from the supply line toward the rod-side line but prevents a reverse flow is located at the second switching valve or the relay line.

9. The hydraulic excavator drive system according to claim 1, wherein the first pump is connected to the tank by a suction/delivery line, the hydraulic excavator drive system comprises a third switching valve located on a regenerative line that connects the suction/delivery line to a part of the rod-side line, the part extending between the rod-side chamber and the first switching valve, the third switching valve being a switching valve that opens the regenerative line at a boom lowering operation, but blocks the regenerative line except at the boom lowering operation, and the first switching valve blocks the rod-side line at the boom lowering operation.

10. The hydraulic excavator drive system according to claim 9, wherein a fourth switching valve is located on the suction/delivery line, such that the suction/delivery line is divided into a tank-side passage and a pump-side passage, the regenerative line connects the pump-side passage of the suction/delivery line to the part of the rod-side line, the part extending between the rod-side chamber and the first switching valve, the fourth switching valve is connected to the tank by a parallel line on which a check valve having a predetermined cracking pressure is located, and at the boom lowering operation, the fourth switching valve brings the pump-side passage into communication with the parallel line, but except at the boom lowering operation, the fourth switching valve brings the pump-side passage into communication with the tank-side passage.

11. The hydraulic excavator drive system according to claim 1, comprising a vehicle body lifting switching valve located on a bypass line that connects the head-side line to the tank, the vehicle body lifting switching valve being a switching valve that opens the bypass line at the vehicle body lifting operation, but blocks the bypass line except at the vehicle body lifting operation.

* * * * *